Feb. 15, 1966   H. T. KLEYSEN   3,235,110
FORK LIFT DEVICES FOR SEMI-TRAILER CAB UNITS
Filed May 11, 1964   2 Sheets-Sheet 1

INVENTOR
HUBERT T KLEYSEN
By
HIS ATTY'S

Feb. 15, 1966  H. T. KLEYSEN  3,235,110
FORK LIFT DEVICES FOR SEMI-TRAILER CAB UNITS
Filed May 11, 1964  2 Sheets-Sheet 2

INVENTOR
HUBERT. T. KLEYSEN

United States Patent Office 3,235,110
Patented Feb. 15, 1966

3,235,110
FORK LIFT DEVICES FOR SEMI-TRAILER
CAB UNITS
Hubert T. Kleysen, 131 St. Vital Road, Winnipeg,
Manitoba, Canada
Filed May 11, 1964, Ser. No. 366,532
7 Claims. (Cl. 214—674)

My invention relates to new and useful improvements in attachments for semi-trailers.

Conventional semi-trailer units comprise a self propelled cab unit to which is detachably secured the trailer unit by means of sole plate assembly mounted on the rear chassis of the cab unit. A fork lift is normally utilized to load or unload the trailer units but as the loading or unloading is often under taken in locations where a fork lift truck is not readily available, it is conventional for semi-trailers to carry their own fork lift truck within the trailer unit.

It will therefore be appreciated that a considerable amount of equipment in the form of fork lift trailers is required and this equipment, apart from being relatively expensive, is unused the majority of time.

Furthermore this equipment takes up considerable space within the trailer unit which normally could be used for the transportation of revenue bearing merchandise.

I have overcome these disadvantages by designing a relatively simple fork lift unit adapted to be pivotally secured to the rear end of the cab unit and to be stored normally below the sole plate assembly until it is required for use whereupon it may be elevated to the vertical, operating position.

The principal object and essence of my invention is therefore to provide a device of the character herewithin described which is self contained inasmuch as it is permanently secured to the cab unit.

Another object of my invention is to provide a device of the character herewithin described in which, when the fork lift assembly is in the folded position, the sole plate assembly is usable in the normal manner for the attachment of trailer units.

Still another object of my invention is to provide a device of the character herewithin described which can be elevated and retracted from the source of hydraulic power normally incorporated in a cab unit, which source of power can also operate the fork lift lifting assembly.

A yet further object of the invention is to provide a device of the character herewithin described which can be fitted to existing cab units with relatively small alterations thereto.

Still another object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
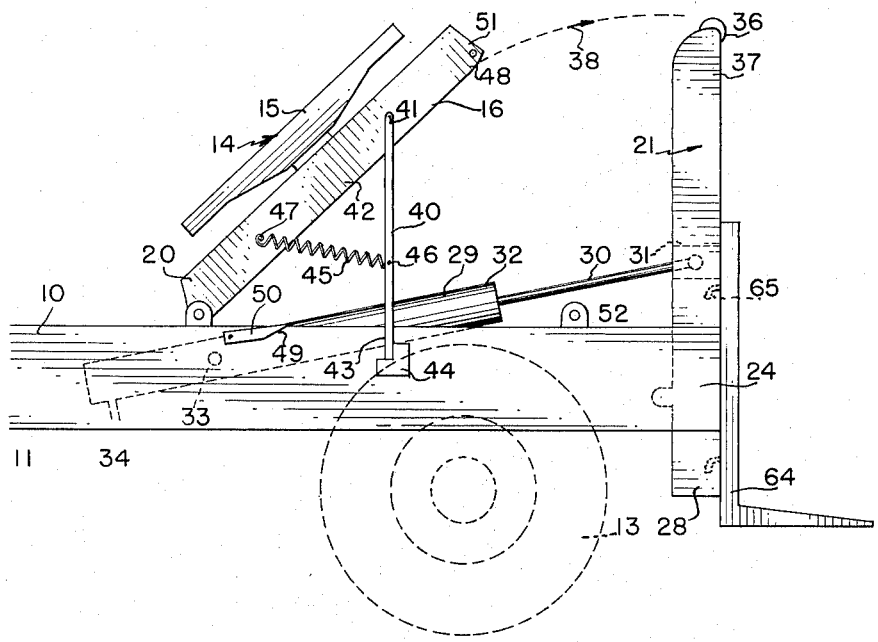
FIGURE 1 is a side elevation of the rear end of a conventional cab unit showing my device in the vertical or operable position.

Proceeding now to describe my invention in detail, reference character 10 illustrates the rear end of a conventional cab unit, said cab unit including a source of power and a source of hydraulic fluid pressure (neither of which are illustrated).

The cab includes a pair of spaced and parallel side chassis members 11 maintained in spaced apart relationship by one or more transverse members 12 and supported upon rear drive wheels 13 in conjunction with a conventional rear axle (not illustrated).

A sole plate assembly collectively designated 14 is normally positioned between the chassis members 11 and is utilized for the attachment of the conventional trailer unit (not illustrated).

Figure 5:
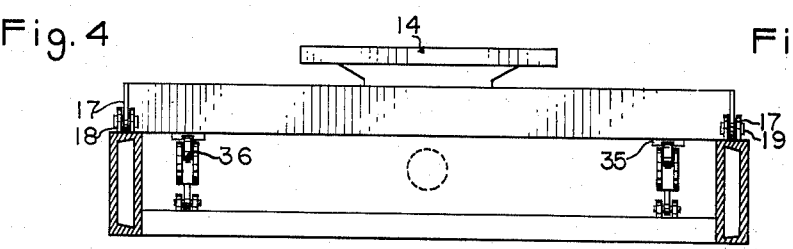
FIGURE 5 is a rear elevation of the device showing same in the lowermost position.

In this particular embodiment, the sole plate unit 14 includes the sole plate 15 and a base assembly 16 upon which the sole plate is mounted. This base assembly is provided with downwardly depending lugs 17 one upon each side thereof by which it is pivotally secured between corresponding lugs 18 on the side chassis members 11, by means of pivot pins 19 as shown in FIGURE 5.

This pivotal attachment of the base 16 is at the front end 20 thereof as clearly shown in FIGURE 1.

A fork lift assembly collectively designated 21 is provided, said fork lift assembly including an open, rectangular frame 22 having a conventional fork lifting assembly collectively designated 23 mounted therein in the conventional manner.

This main frame 22 is pivotally secured to the rear ends 24 of the side chassis members 11 by the provision of lugs 25 on the main frame 22 engaging within lugs 26 upon chassis cross member 12, pivot pin 27 forming the pivotal attachment between the lugs 25 and 26.

Figure 2:
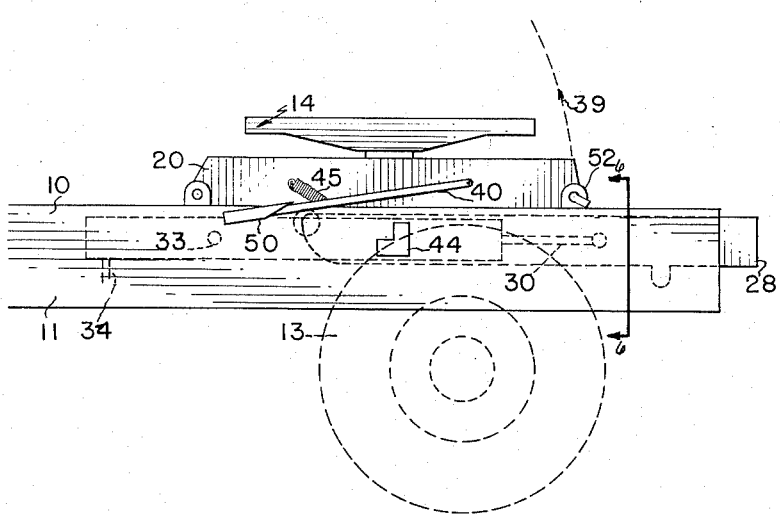
FIGURE 2 is a view similar to FIGURE 1 but showing the device in the horizontal or stored position.
Figure 3:
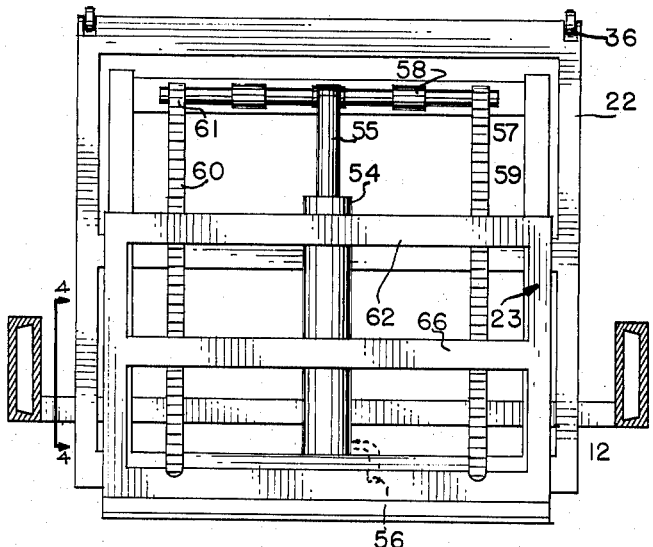
FIGURE 3 is an end view of the fork lift assembly.
Figure 4:
FIGURE 4 is an enlarged fragmentary view showing the attachment of the fork lift frame to the cab unit chassis substantially along the line 4—4 of FIGURE 3.
Figure 6:
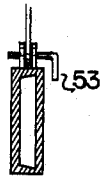
FIGURE 6 is an enlarged fragmentary view showing the securing means for the sole plate in the lowermost position substantially along the line 6—6 of FIGURE 2.

The main frame and lifting assembly is positioned with the point of pivotal attachment adjacent the lower ends 28 of the main frame 22 thus permitting the fork lift assembly 21 to be positioned in the vertical position illustrated in FIGURE 1 or, alternatively, to be positioned in the horizontal stored position situated between the frame members 11 and above the rear axle, as illustrated in FIGURE 2.

The fork lift assembly 21 is moved from the vertical position in FIGURE 1 to the stored position in FIGURE 2 and vice versa by a hydraulic piston and cylinder assembly 29, the piston rod 30 of which is pivotally secured to a cross member 31 on the fork lift assembly. The cylinder 32 is mounted within trunnions 33 situated upon the chassis so that it can pivot within limits from the position shown in FIGURE 1 to the position shown in FIGURE 2.

Conduit 34 extends to a source of hydraulic power and supplies the necessary fluid power to the piston and cylinder assembly 29.

A pair of spaced and parallel tracks 35 are provided upon the underside of the base 16 of the sole plate assembly and these are engageable by rollers 36 journalled for rotation as the upper end 37 of the fork lift assembly.

It will therefore be appreciated that if fluid power is applied to the piston and cylinder assembly when in the position shown in FIGURE 2, the fork lift assembly will move in the direction of arrow 38 forcing the sole plate assembly to move in the direction of arrow 39 to take up the position shown in FIGURE 1.

In this connection I have provided a strut 40 pivotally secured by pivot pin 41 to the side 42 of the base 16. This strut is freely pivoted at 41 so that as the sole plate assembly rises to the position shown in FIGURE 1, the strut swings by gravity so that the lower end 43 engages within a bracket 44 secured to one chassis member 11. As soon as the rollers 36 have cleared the ends of the tracks 35, the sole plate assembly is maintained in the position shown in FIGURE 1 by means of the strut 40.

A tension spring 45 is detachably securable to the strut 40 by means of hook 46 and is also secured to the side 42 of the base 16 at point 47. When the sole plate is being raised to the position shown in FIGURE 1, the spring 45 is detached from the strut thus allowing it to swing by gravity to the vertical position and engage the bracket 44.

However the spring is then connected to point 46 on the strut in preparation for the lowering action of the fork lift assembly.

When it is desired to lower the fork lift assembly, piston rod 30 is retracted within cylinder 32 in the normal manner thus pivoting the fork lift assembly in a direction opposite to arrow 38. As the rollers engage the up curved ends 48 of tracks 35, the sole plate assembly is raised slightly thus taking the load from strut 40 and permitting spring 45 to snap the strut rearwardly. This permits the sole plate to be lowered as the fork lift assembly is lowered to the horizontal position.

The lower end 43 of the strut engages the chamfered end 49 of a strut storage tube 50 secured to the chassis member 11 and the end of the strut slides into this tube as the sole plate assembly returns to the horizontal position as shown in FIGURE 2.

It will be noted that I have provided lugs 51 upon each side of the base 16 of the sole plate assembly and these lugs engage between corresponding pairs of lugs 52 secured to the upper surface of the chassis members 11 so that lock pins 53 can be placed through the lugs thus anchoring the sole plate in the horizontal position.

The lifting assembly 23 is conventional in construction and includes cylinder 54 and piston rod 55 connected to the source of fluid pressure by means of hose 56. Cross shaft 57 is secured to the end of piston rod 55 and is supported within bearings 58 secured to the lift frame 59. Chains 60 pass over sprockets 61 and operate to extend the mast or lifting component 62 in the conventional manner.

I have provided fork members 64 which are detachably securable to the mast or lifting assembly 62 by means of hook portions 65 engaging over the cross members 66 of the mast or lifting component 62 so that it is only necessary to remove these fork members 64 when it is desired to lower the assembly shown in the position in FIGURE 2. The fork members 64 are easily stored either within the cab or within the trailer unit and are ready for use merely by hooking into position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a self propelled semi-trailer cab unit including a source of hydraulic fluid power, a pair of spaced and parallel chassis members, and a sole plate assembly mounted on said cab unit for detachably securing a semi-trailer thereto; a fork lift assembly pivotally connected between the rear end of said chassis members for movement between the vertical, operable position and the horizontal, storage position, said sole plate assembly being pivotally secured by the front side thereof to said chassis members, a hydraulic piston and cylinder assembly extending between said chassis and said fork lift assembly and means cooperating between said fork lift assembly and said sole plate assembly for raising said sole plate assembly when said fork lift assembly is moved to the vertical position and to lower said sole plate assembly when said fork lift assembly is moved to the horizontal position, said fork lift assembly lying horizontally between said chassis members and below said sole plate assembly when said fork lift assembly is in the horizontal stored position.

2. The device according to claim 1 in which said fork lift assembly includes a rectangular main frame pivotally secured to said chassis members, a lifting assembly mounted for vertical reciprocation within said main frame and a pair of fork members detachably connectable to said lifting assembly.

3. The device according to claim 2 in which said means includes a pair of rollers journalled for rotation at the upper end of said main frame, a pair of spaced and parallel tracks secured to the underside of said sole plate assembly engageable by said rollers.

4. The device according to claim 2 which includes a strut pivotally secured by one end thereof to one side of said sole plate assembly and a strut receiving bracket on one of said chassis members below said strut engageable by the other end of said strut when said sole plate assembly is in the raised position.

5. The device according to claim 3 which includes a strut pivotally secured by one end thereof to one side of said sole plate assembly and a strut receiving bracket on one of said chassis members below said strut engageable by the other end of said strut when said sole plate assembly is in the raised position.

6. The device according to claim 4 which includes a strut receiving tube secured to said chassis members engageable by said other end of said strut when said sole plate is in the lower position.

7. The device according to claim 5 which includes a strut receiving tube secured to said chassis members engageable by said other end of said strut when said sole plate is in the lower position.

References Cited by the Examiner

UNITED STATES PATENTS

| | | | |
|---|---|---|---|
| 2,900,099 | 8/1959 | Cook | 214—674 |
| 2,910,203 | 10/1959 | Todd | 214—672 |

HUGO O. SCHULZ, *Primary Examiner.*